United States Patent
Mehanna

(10) Patent No.: US 8,874,606 B2
(45) Date of Patent: *Oct. 28, 2014

(54) SOURCING TERMS INTO A SEARCH ENGINE

(75) Inventor: Lara Mehanna, Arlington, VA (US)

(73) Assignee: Facebook, Inc., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/099,214

(22) Filed: May 2, 2011

(65) Prior Publication Data

US 2011/0208768 A1    Aug. 25, 2011

Related U.S. Application Data

(63) Continuation of application No. 11/420,042, filed on May 24, 2006, now Pat. No. 7,962,504.

(60) Provisional application No. 60/684,522, filed on May 26, 2005.

(51) Int. Cl.
*G06F 17/30* (2006.01)

(52) U.S. Cl.
CPC .... *G06F 17/30424* (2013.01); *G06F 17/30011* (2013.01); *G06F 17/30864* (2013.01); *G06F 17/30554* (2013.01)
USPC .......................................................... 707/767

(58) Field of Classification Search
USPC .................................. 707/765, 766, 767
See application file for complete search history.

(56) References Cited

U.S. PATENT DOCUMENTS

| | | | |
|---|---|---|---|
| 4,650,927 A | 3/1987 | James | |
| 4,817,129 A | 3/1989 | Riskin | |
| 5,592,538 A | 1/1997 | Kosowsky et al. | |
| 5,749,081 A | 5/1998 | Whiteis et al. | |
| 5,799,284 A | 8/1998 | Bourquin | |
| 5,835,905 A | 11/1998 | Pirolli et al. | |
| 5,845,300 A | 12/1998 | Comer et al. | |
| 5,870,744 A | 2/1999 | Sprague | |
| 5,895,454 A | 4/1999 | Harrington | |
| 5,896,321 A | 4/1999 | Miller et al. | |
| 5,913,032 A | 6/1999 | Schwartz et al. | |
| 5,950,193 A | 9/1999 | Kulkarni | |
| 5,960,429 A | 9/1999 | Peercy et al. | |
| 5,999,932 A | 12/1999 | Paul | |
| 6,041,311 A | 3/2000 | Chislenko et al. | |

(Continued)

FOREIGN PATENT DOCUMENTS

| EP | 1054329 | 11/2000 |
|---|---|---|
| JP | 4-86950 | 3/1992 |

(Continued)

OTHER PUBLICATIONS

Office Action in U.S. Appl. No. 10/715,216, mailed Aug. 18, 2009, 33 pages.

(Continued)

*Primary Examiner* — Marc Filipczyk
(74) *Attorney, Agent, or Firm* — Keller Jolley Preece

(57) ABSTRACT

Information may be presented to a user by receiving a selection of one or more terms passively displayed in a document, loading the terms to a search configuration, generating first results responsive to a user's predicted interest as expressed in the search configuration, and enabling display of the first results.

20 Claims, 11 Drawing Sheets

(56) References Cited

U.S. PATENT DOCUMENTS

| | | | |
|---|---|---|---|
| 6,092,049 A | 7/2000 | Chislenko et al. | |
| 6,157,618 A | 12/2000 | Boss et al. | |
| 6,189,026 B1 | 2/2001 | Birrell et al. | |
| 6,208,996 B1 | 3/2001 | Ben-Shachar et al. | |
| 6,237,092 B1 | 5/2001 | Hayers, Jr. | |
| 6,247,043 B1 | 6/2001 | Bates et al. | |
| 6,260,148 B1 | 7/2001 | Aggarwal et al. | |
| 6,269,369 B1 | 7/2001 | Robertson | |
| 6,292,743 B1 | 9/2001 | Pu et al. | |
| 6,301,609 B1 | 10/2001 | Aravamudan et al. | |
| 6,327,590 B1 | 12/2001 | Chidlovskii et al. | |
| 6,349,299 B1 | 2/2002 | Spencer et al. | |
| 6,360,251 B1 | 3/2002 | Fujita et al. | |
| 6,392,669 B1 | 5/2002 | Matoba et al. | |
| 6,430,604 B1 | 8/2002 | Ogle et al. | |
| 6,457,044 B1 | 9/2002 | IwaZaki | |
| 6,463,471 B1 | 10/2002 | Dreke et al. | |
| 6,466,918 B1 | 10/2002 | Spiegel et al. | |
| 6,529,903 B2 | 3/2003 | Smith et al. | |
| 6,549,933 B1 | 4/2003 | Barrett et al. | |
| 6,549,937 B1 | 4/2003 | Auerbach et al. | |
| 6,564,213 B1 | 5/2003 | Ortega et al. | |
| 6,564,264 B1 | 5/2003 | Creswell et al. | |
| 6,567,796 B1 | 5/2003 | Yost et al. | |
| 6,606,657 B1 | 8/2003 | Zilberstein et al. | |
| 6,615,237 B1 | 9/2003 | Kyne et al. | |
| 6,643,669 B1 | 11/2003 | Novak et al. | |
| 6,647,383 B1 | 11/2003 | August et al. | |
| 6,677,968 B1 | 1/2004 | Appelman | |
| 6,687,362 B1 | 2/2004 | Lindquist et al. | |
| 6,694,353 B2 | 2/2004 | Sommerer | |
| 6,701,348 B2 | 3/2004 | Sommerer | |
| 6,704,727 B1 | 3/2004 | Kravets | |
| 6,711,565 B1 | 3/2004 | Subramaniam et al. | |
| 6,714,791 B2 | 3/2004 | Friedman | |
| 6,750,881 B1 | 6/2004 | Appelman | |
| 6,751,603 B1 | 6/2004 | Bauer et al. | |
| 6,829,607 B1 | 12/2004 | Tafoya et al. | |
| 6,847,960 B1 | 1/2005 | Li et al. | |
| 6,848,077 B1 | 1/2005 | McBrearty et al. | |
| 6,848,542 B2 | 2/2005 | Gailey et al. | |
| 6,853,982 B2 | 2/2005 | Smith et al. | |
| 6,912,505 B2 | 6/2005 | Linden et al. | |
| 6,912,564 B1 | 6/2005 | Appleman et al. | |
| 6,968,332 B1 * | 11/2005 | Milic-Frayling et al. | 707/723 |
| 6,999,959 B1 | 2/2006 | Lawrence et al. | |
| 7,007,008 B2 | 2/2006 | Goel et al. | |
| 7,007,228 B1 | 2/2006 | Carro | |
| 7,031,961 B2 | 4/2006 | Pitkow et al. | |
| 7,035,865 B2 | 4/2006 | Doss et al. | |
| 7,058,690 B2 | 6/2006 | Machiro | |
| 7,089,237 B2 | 8/2006 | Turnbull et al. | |
| 7,096,214 B1 | 8/2006 | Bharat et al. | |
| 7,146,416 B1 | 12/2006 | Yoo et al. | |
| 7,185,059 B2 | 2/2007 | Daniell et al. | |
| 7,275,215 B2 | 9/2007 | Werndorfer et al. | |
| 7,308,439 B2 | 12/2007 | Baird et al. | |
| 7,370,035 B2 | 5/2008 | Gross et al. | |
| 7,424,510 B2 | 9/2008 | Gross et al. | |
| 7,599,916 B2 | 10/2009 | Weare | |
| 7,962,504 B1 | 6/2011 | Mehanna | |
| 8,423,565 B2 | 4/2013 | Redlich et al. | |
| 2001/0002469 A1 | 5/2001 | Bates et al. | |
| 2002/0049610 A1 | 4/2002 | Gropper | |
| 2002/0049704 A1 | 4/2002 | Vanderveldt et al. | |
| 2002/0049751 A1 | 4/2002 | Chen et al. | |
| 2002/0052921 A1 | 5/2002 | Morkel | |
| 2002/0059401 A1 | 5/2002 | Austin | |
| 2002/0097856 A1 | 7/2002 | Wullert, II | |
| 2002/0116528 A1 | 8/2002 | Vale | |
| 2002/0123988 A1 | 9/2002 | Dean et al. | |
| 2002/0138650 A1 | 9/2002 | Yamamoto et al. | |
| 2002/0169748 A1 | 11/2002 | Macholda | |
| 2002/0184128 A1 | 12/2002 | Holtsinger | |
| 2002/0194166 A1 | 12/2002 | Fowler | |
| 2003/0009385 A1 | 1/2003 | Tucciarone et al. | |
| 2003/0046097 A1 | 3/2003 | LaSalle et al. | |
| 2003/0054830 A1 | 3/2003 | Williams et al. | |
| 2003/0058478 A1 | 3/2003 | Aoki | |
| 2003/0105682 A1 | 6/2003 | Dicker et al. | |
| 2003/0105822 A1 | 6/2003 | Gusler et al. | |
| 2003/0119561 A1 | 6/2003 | Hatch et al. | |
| 2003/0158860 A1 | 8/2003 | Caughey | |
| 2003/0172061 A1 * | 9/2003 | Krupin et al. | 707/3 |
| 2003/0177175 A1 | 9/2003 | Worley et al. | |
| 2003/0220946 A1 | 11/2003 | Malik | |
| 2003/0220976 A1 | 11/2003 | Malik | |
| 2004/0029572 A1 | 2/2004 | Nerot | |
| 2004/0030741 A1 | 2/2004 | Wolton et al. | |
| 2004/0044536 A1 | 3/2004 | Fitzpatrick et al. | |
| 2004/0044736 A1 | 3/2004 | Austin-Lane et al. | |
| 2004/0054646 A1 | 3/2004 | Daniell et al. | |
| 2004/0054736 A1 | 3/2004 | Daniell et al. | |
| 2004/0059708 A1 | 3/2004 | Dean et al. | |
| 2004/0133564 A1 | 7/2004 | Gross et al. | |
| 2004/0143564 A1 | 7/2004 | Gross et al. | |
| 2004/0148347 A1 | 7/2004 | Appelman et al. | |
| 2004/0204140 A1 | 10/2004 | Nagata | |
| 2004/0215793 A1 | 10/2004 | Ryan et al. | |
| 2004/0267604 A1 | 12/2004 | Gross et al. | |
| 2005/0071251 A1 | 3/2005 | Linden et al. | |
| 2005/0080780 A1 * | 4/2005 | Colledge et al. | 707/4 |
| 2005/0102202 A1 | 5/2005 | Linden et al. | |
| 2005/0154716 A1 | 7/2005 | Watson et al. | |
| 2005/0222976 A1 * | 10/2005 | Pfleger | 707/3 |
| 2006/0173818 A1 | 8/2006 | Berstis et al. | |
| 2006/0259476 A1 | 11/2006 | Kadayam et al. | |
| 2013/0073579 A1 | 3/2013 | Mehanna | |
| 2013/0191382 A1 | 7/2013 | Mehanna | |
| 2013/0198160 A1 | 8/2013 | Mehanna | |
| 2013/0204870 A1 | 8/2013 | Mehanna | |

FOREIGN PATENT DOCUMENTS

| | | |
|---|---|---|
| JP | 08-123821 | 5/1996 |
| JP | 9-247334 | 9/1997 |
| JP | 11-161682 | 6/1999 |
| JP | 11-328194 | 11/1999 |
| JP | 2000-148795 | 5/2000 |
| JP | 2000-222424 | 8/2000 |
| JP | 2001-109752 | 4/2001 |
| JP | 2002-7479 | 1/2002 |
| JP | 2002-132832 | 5/2002 |
| JP | 2002-175301 | 6/2002 |
| KR | 2001-048800 | 6/2001 |
| WO | WO 0180079 | 10/2001 |
| WO | WO 02093400 | 11/2002 |
| WO | WO 02093875 | 11/2002 |

OTHER PUBLICATIONS

Komatsu et al., "Text Input with Dynamic Abbreviation Expansion," IPSJ SIG Notes, vol. 2001, No. 87, Sep. 14, 2008, pp. 133-138, partial English translation.

English translation of an Office Action issued in corresponding Japanese Application No. 2004-570418 on Aug. 7, 2008.

English translation of an Office Action issued in corresponding Japanese Application No. 2004-570418 on Feb. 5, 2009.

Office Action in U.S. Appl. No. 10/715,213, mailed Aug. 7, 2008, 23 pages.

Office Action in U.S. Appl. No. 10/715,213, mailed Feb. 5, 2009, 30 pages.

Final Office Action in U.S. Appl. No. 10/715,213, mailed Oct. 22, 2007, 14 pages.

Office Action from the Canadian Intellectual Property Office in corresponding Canadian Application No. 2,506,417, dated Aug. 14, 2007, 3 pages.

European Office Action in Application No. 03 811 631.5-2201, dated Oct. 4, 2006, 4 pages.

Office Action in U.S. Appl. No. 10/715,213, mailed Apr. 26, 2007, 15 pages.

Jennifer Lee, "From 100 countries, a Google snapshot of what's going on," International Herald Tribune, Nov. 29, 2002, 3 pages.

(56) References Cited

OTHER PUBLICATIONS

Yahoo! Buzz Index, Feb. 13, 2003, 1 page, http://buzz/yahoo.com/overall/.

Danny Sullivan, "What People Search for," Search Engin Watch, 4 pages, (http://searchenginewatch.com/facts/searches.html , visited Feb. 13, 2003).

"Google Zeitgeist—Search patterns, trends, and surprises according to Google," Jan. 2003, 2 pages, (http://www.google.com/press/zeitgeist.html visited Feb. 13, 2003).

Yahoo! Buzz Index, Nov. 10, 2002, 1 page.

Supplementary European Search Report in Application No. EP 03 81 1631, dated Jun. 23, 2006, 3 pages.

Bryan Pfaffenberger, Newscape Navigator Gold, AP Professional, 1997.

Automated feature of Internet Explorer, www.geocities.com/technofundo/tech/web/ie_autocomplete.html, Feb. 18, 2004, 6 pages.

Mozilla, www.mozilla.org/projects/ml/autocomplete, Mar. 3, 2003, 6 pages.

International Search Report in International Application No. PCT/US03/36656, dated Apr. 22, 2004, 8 pages.

"Index of/tarvizo/OldFiles/elisp/tnt-2.4," Jan. 25, 2007, http://web.mit.edu/tarvizo/OldFiles/elisp/tnt-2.4/, 9 pages.

Final Office Action in U.S. Appl. No. 10/715,213, mailed Aug. 6, 2009, 30 pages.

Examiner's Answer to Appeal Brief in U.S. Appl. No. 10/715,213, mailed May 27, 2010, 31 pages.

Advisory Action in U.S. Appl. No. 10/715,213, mailed Mar. 1, 2010, 3 pages.

Advisory Action in U.S. Appl. No. 10/715,213, mailed Jan. 11, 2008, 3 pages.

Cerulean Studios, "Trillian Pro: No Boundaries," (Overview, New Features, Tech Specs, Corporate, Product Tour), 16 pages.

Cerulean Studios, "Trillian: Your Freedom to Chat," (Overview, Features, Screenshots, Tech Specs), 8 pages.

Morikawa, et al., "Part 2 Build up a Comfortable Search Environment via Customization by Rules," PC Japan, vol. 7, No. 10, pp. 172-176, partial English translation of p. 172-176, Nov. 2002.

Yahoo! Messenger, "Messenger Help," 4 pages, Nov. 2002.

U.S. Appl. No. 11/420,042, mailed Mar. 17, 2008, Office Action.

U.S. Appl. No. 11/420,042, mailed Sep. 24, 2008, Office Action.

U.S. Appl. No. 11/420,042, mailed Mar. 9, 2009, Office Action.

U.S. Appl. No. 11/420,042, mailed Oct. 14, 2009, Office Action.

U.S. Appl. No. 11/420,042, mailed Jun. 21, 2010, Office Action.

U.S. Appl. No. 11/420,042, mailed Feb. 2, 2011, Notice of Allowance.

U.S. Appl. No. 13/618,920, mailed Jul. 17, 2013, Office Action.

U.S. Appl. No. 13/618,920, mailed Nov. 5, 2013, Office Action.

U.S. Appl. No. 13/618,920, mailed Mar. 24, 2014, Office Action.

U.S. Appl. No. 13/801,826, mailed Feb. 28, 2014, Office Action.

* cited by examiner

Figure 2:
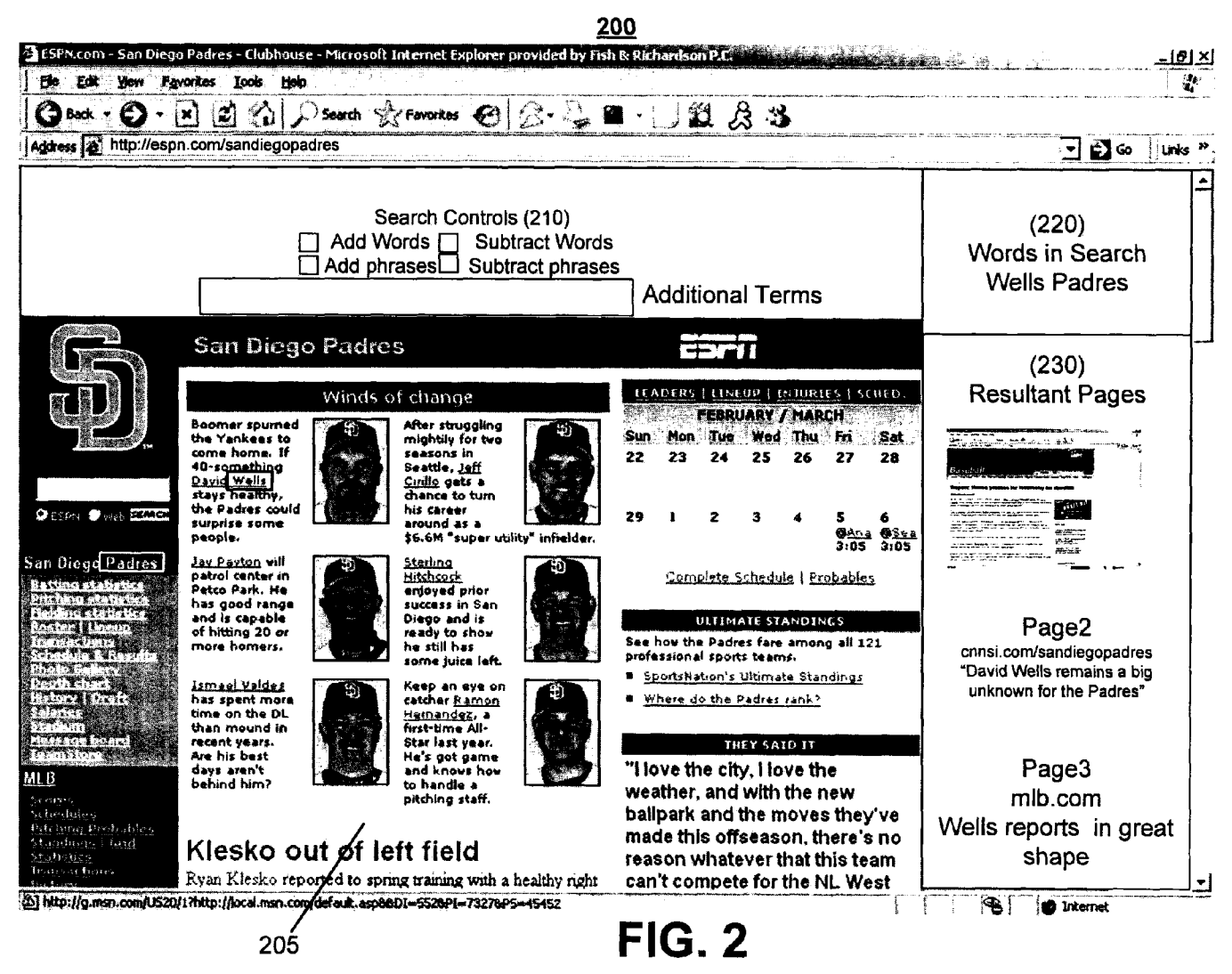

200

Search Controls (210)
☐ Add Words  ☐ Subtract Words
☐ Add phrases  ☐ Subtract phrases Additional Terms (220) Words in Search
Wells Padres (230) Resultant Pages Page2
cnnsi.com/sandiegopadres
"David Wells remains a big unknown for the Padres"

Page3
mlb.com
Wells reports in great shape

Search Controls (410)
- ☐ Add Words ☐ Subtract Words
- ☐ Add phrases ☐ Subtract phrases Additional Terms

(420)
Search parameters
"San Diego Padres"
Wells
Topic1

(430)
Resultant SubTopics

TOPIC1.1

TOPIC1.2

TOPIC1.4

Resultant pages

PAGE1

PAGE2

PAGE3

Search Controls (710)
- Favor Word(s)
- Require Word(s)
- Disfavor Word(s)
- Do Not Allow Word(s)

Additional Terms (720)
Search parameters
Require Cubs
Favor Zambrano
Disfavor Spring Training
Disfavor TOPIC1

(730)
Results
TOPIC1
TOPIC2
TOPIC3

Resultant pages
PAGE1
PAGE2
PAGE3

FIG. 7

FIG. 8 ered to U.S. Provisional Application No. 60/684,
SOURCING TERMS INTO A SEARCH ENGINE

CROSS-REFERENCE TO RELATED APPLICATIONS

This application claims is a continuation of and claims the benefit of priority to U.S. patent application Ser. No. 11/420, 042, filed May 24, 2006 now U.S. Pat. No. 7,962,504, which claims priority to U.S. Provisional Application No. 60/684, 522, filed May 26, 2005. The contents of the above-referenced applications are expressly incorporated herein by reference in their entireties.

TECHNICAL FIELD

This document relates to content retrieval and presentation.

BACKGROUND

The Internet enables users to access a great amount of information. A user with a web browser, messaging application, or other proprietary application may retrieve information from large libraries to access great amounts of information. Navigating the great amount of information can challenge some users.

SUMMARY

In a general aspect, information is presented to a user. Terms within a document are presented to visually distinguish selectable candidate search terms that are included within the document from other terms that are included within the document. Selection of one or more of the selectable candidate search terms from within the document is enabled. A query string that includes the selected candidate search terms is generated. The query string is applied to a search interface. Query results are received based on the applied query string. The query results are presented.

With respect to at least the general aspect, implementations may include one or more of the following features. For example, the arrangement of the document may be retained on a visual display when visually distinguishing selectable candidate search terms from other terms within the document and enabling selection of one or more of the selectable candidate search terms from within the document by detecting selection of a portion of the screen real estate dedicated to presenting the document and corresponding to the selected candidate search terms.

A query string that expressly excludes or disfavors candidate search terms selected from within the document may be generated. A query string that expressly includes or favors candidate search terms selected from within the document may be generated.

A compilation of candidate search terms may be generated from multiple documents. The query string may be revised as a user progresses through the multiple documents and selects the candidate search terms from at least two different documents in the multiple documents.

Resultant pages may be presented in association with the document so that the user may perceive an effect of selecting the candidate term on the query results.

A search control enabling a user to specify an input mode may be presented. An additive control may be presented and configured to add the selected candidate search terms to the search query in response to selecting a candidate search term in the document. A subtractive control may be presented and configured to add the selected candidate search terms to the search query as terms that should not appear in the query results.

The user may be enabled to continue to select one or more additional candidate search terms as the query results are being presented. The additional candidate search terms may be used to modify the query string. The modified query string may be applied to the search interface. Updated results may be received based on the applied query string. The updated results may be presented so that the user may perceive an effect of modifying the query string in differences between the query results and the updated results.

One or more topics responsive to the query string may be presented. The user may be enabled to modify the query string with inclusion or exclusion of at least one of the topics. The query string may be applied to the search interface. The query results may be received based on the applied query string. The query results may be presented so that the user may perceive an effect of modifying the query string based on modifying the query string with inclusion or exclusion of the at least one topic.

The user may be enabled to specify interest in a portion of the query results or interest in avoiding the portion of the query results and generating the first results responsive to the user specifying interest in the first results related to the selected candidate search terms or interest in avoiding the query results related to the selected candidate search terms.

Transparent to the user, the document may be automatically analyzed to generate contextual information. The contextual information may be used as the query string is applied to the search interface. Transparent to the user, non-selected terms appearing in the document related to the selected candidate search terms may be automatically accessed. The non-selected terms may be used as the query string is applied to the search interface.

User manipulation of the query results may be monitored. That the user investigated a portion of the query results may be determined. That the portion was not responsive may be determined. The query string may be modified to reflect that the portion was not responsive to a user's predicted interest.

The user may be prompted to confirm that that the portion was not responsive. That the portion was not responsive may be specified without confirmation from the user.

The query string may be maintained as the user changes the document. The user may be enabled to modify the query string with the candidate search terms after changing the document. The user may specify that query results associated with less viewership should be rendered before query results associated with more viewership.

DESCRIPTION OF DRAWINGS

FIGS. 1-8 are exemplary graphical user interfaces (GUIs) illustrating how real-time results related to a selected items within a source document may be presented.

DETAILED DESCRIPTION

The Internet enables access to large volumes of content. A key challenge in providing a better access experience for users is enabling the users to access information most relevant to their interests with the least amount of effort in retrieving the results.

To better provide a user with the ability to easily invoke a search for information most relevant to content they presently access, a user is presented with a collection of terms that appear within a document they presently view, arranged and presented for selection as search terms. Specifically, for example, one or more selectable search terms within a document being viewed is made identifiable and selectable, such that a query string that includes terms selected from within the arrangement may be easily generated through selection of those terms. The query string is applied to a search interface and query results may be received based on the applied query string. Finally, query results are presented.

For example, a user may elect to invoke a search tool within a web browser. Invoking the search tool may allow the user to select terms in order to add the terms to a search configuration. The addition of a search term to the search configuration may trigger an update to the results so that a user may dynamically add terms to a search configuration to observe the impact on search results. Additionally, the user also may be presented with a taxonomy of search results (e.g., topics) so that the user may modify the search configuration to include, avoid, favor, or disfavor specified topics from the search results. By enabling terms appearing in a source document or topics related to the source document to added or removed from a search configuration and automatically presenting results in response, a user may quickly navigate a large library with a reduced number of actions.

FIGS. 1-8 illustrate how a user may select one or more passive terms in a document in order to generate results responsive to a user's predicted interest. Generally, the GUIs shown in FIGS. 1-8 illustrate GUIs generated by a source application (e.g., a web browser) that displays a source document (e.g., a web page) and that are equipped with search controls. The search controls enable a user to select passive terms in the document in order to generate results responsive to a user's predicted interest. One example of passive terms are terms that have not necessarily been designated as hyperlinked terms, although the user also may select hyperlinked terms for use in generating a search query.

Figure 1:
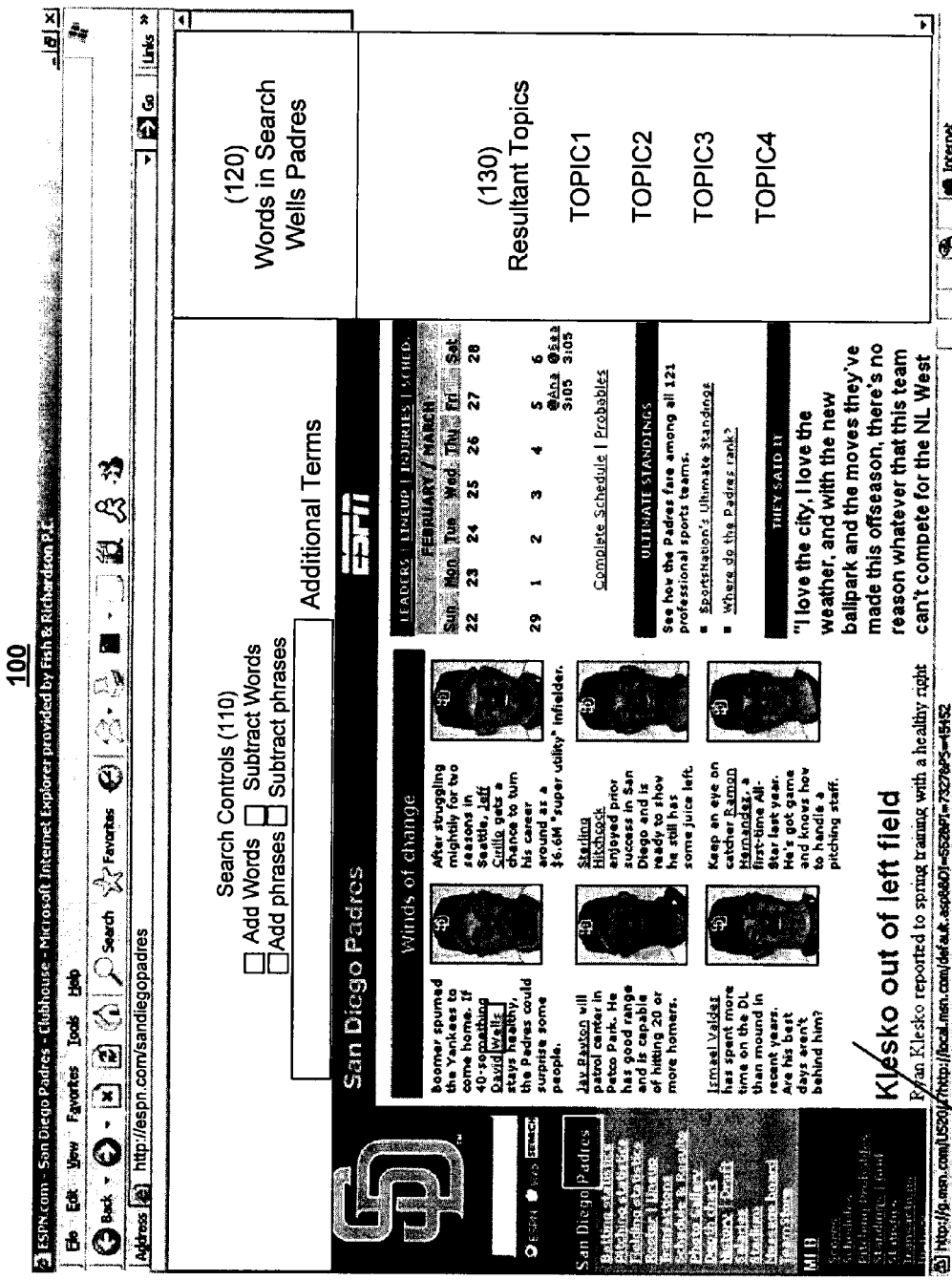

FIG. 1 illustrates an exemplary GUI 100 enabling a user to select terms in order to generate results responsive to a user's predicted interest. In particular, GUI 100 illustrates how a user may select terms appearing in a web page to generate search query. As shown, GUI 100 includes a document 105, search controls 110, search configuration 120, and resultant topics 130 that are rendered in a web browser along side a source web page directed to coverage of a baseball team. The search controls 110 include check boxes that allow selected words and/or phrases to be added or "subtracted" from a search configuration. A term is "subtracted" in that the search query is configured to retrieve search results that avoid, disfavor, or do not include the "subtracted" term.

Search controls 110 include a form enabling the user to enter additional terms to be used in the query string. For example, if the user believes that the addition of a particular term that does not appear in the source document may realize the desired results, and therefore may use the search controls 110 to effect additions of such terms to the query string.

Search configuration 120 illustrates that a query string has been configured to search for terms related to "Wells" and "Padres"—the terms that have been selected from within the source document. In one implementation, the user selects terms by using a mouse button to select words or phrases (e.g., by right clicking on terms appearing in a web page). In another implementation, the user selects the terms by using a scrolling control to advance through terms appearing in the document and/or using a touch screen to identify the selected terms.

In one implementation, selecting a term triggers a display for related metadata (not shown). The user then may select one or more terms in the metadata to further modify the query string. For example, after selecting "Wells", the search configuration 120 may add a control displaying "Yankees" and "No Hitter" as metadata for "Wells." The user may select one or more of the terms in the metadata to modify the search configuration. Alternatively, in another configuration, the terms "Yankees" and "No Hitter" are automatically added to the search configuration without triggering a display.

In yet another implementation, the user elect to exclude one or more terms in the metadata from the results. As a result, the user may select one of the terms in the metadata to add the selected term to the query string with in an indication that the query results should not include and/or be responsive to the selected term. For example, a user may select "Yankees" and indicate that the query results should not reflect any results related to "Wells" that also relates to the "Yankees."

The resultant topic 130 presents a list of topics related to the present search configuration. For example, a user may elect to see the taxonomy/classification of results available. The user then may select topics in order to retrieve results likely to be more responsive to a user's interest.

As the user interacts with the displayed source document(s) and selects a sequence of terms to generate a query string from within the source document, the search configuration 120 and the resultant topics 130 may be updated to reflect the user's selections. Thus, when a user selects a word or phrase for subtraction, the subtracted term maybe rendered in the search configuration 120, and the resultant topics 130 may be updated to reflect the subtracted term.

FIG. 2 illustrates another exemplary GUI 200 enabling a user to select terms in order to generate results responsive to a user's predicted interest. Also, GUI 200 illustrates how search results 230 may include a representation of a web page, representative text appearing in a web page, or a synopsis of a web page. As shown, GUI 200 includes document 205, search controls 210, search configuration 220, and resultant pages 230 that are rendered in a web browser along side a source web page directed to coverage of a baseball team.

The document 205, search controls 210, and search configuration 220 are identical to the GUI 100 shown in FIG. 1. However, rather than a list of resultant topics, GUI 200 includes resultant pages 230 that illustrate a number of different manners in which resultant pages may be rendered. The first result rendered in resultant pages 230 is a thumbnail of a web page determined to be responsive to a user's predicted interest as indicated by the terms selected. The second result rendered in resultant pages 230 includes an address for a web page and an excerpt determined to be relevant to a user's interests. The third result includes an address for a web page and a synopsis of the web page.

The resultant pages 230 may be rendered so that the user may interact with the rendered results to modify the search configuration. For example, a user may subtract the first result from the search configuration, and add the second result to the search configuration. "Subtracting" a term may include configuring a search query such that the query results do not reflect or include the subtracted term. In one implementation, a user left clicks on a representation of the result to render the result in a different window while right clicking on the representation to modify search configuration with the selected representation. Modifying the search configuration with the selected representation may generate a list of metadata for the result and modifies the search configuration to include the metadata as appropriate. The metadata may be provided by the content owner or publisher, generated in advance by a search provider, and/or generated dynamically in response to user interaction with a representation of the result (either on a host or on the client).

Figure 3:
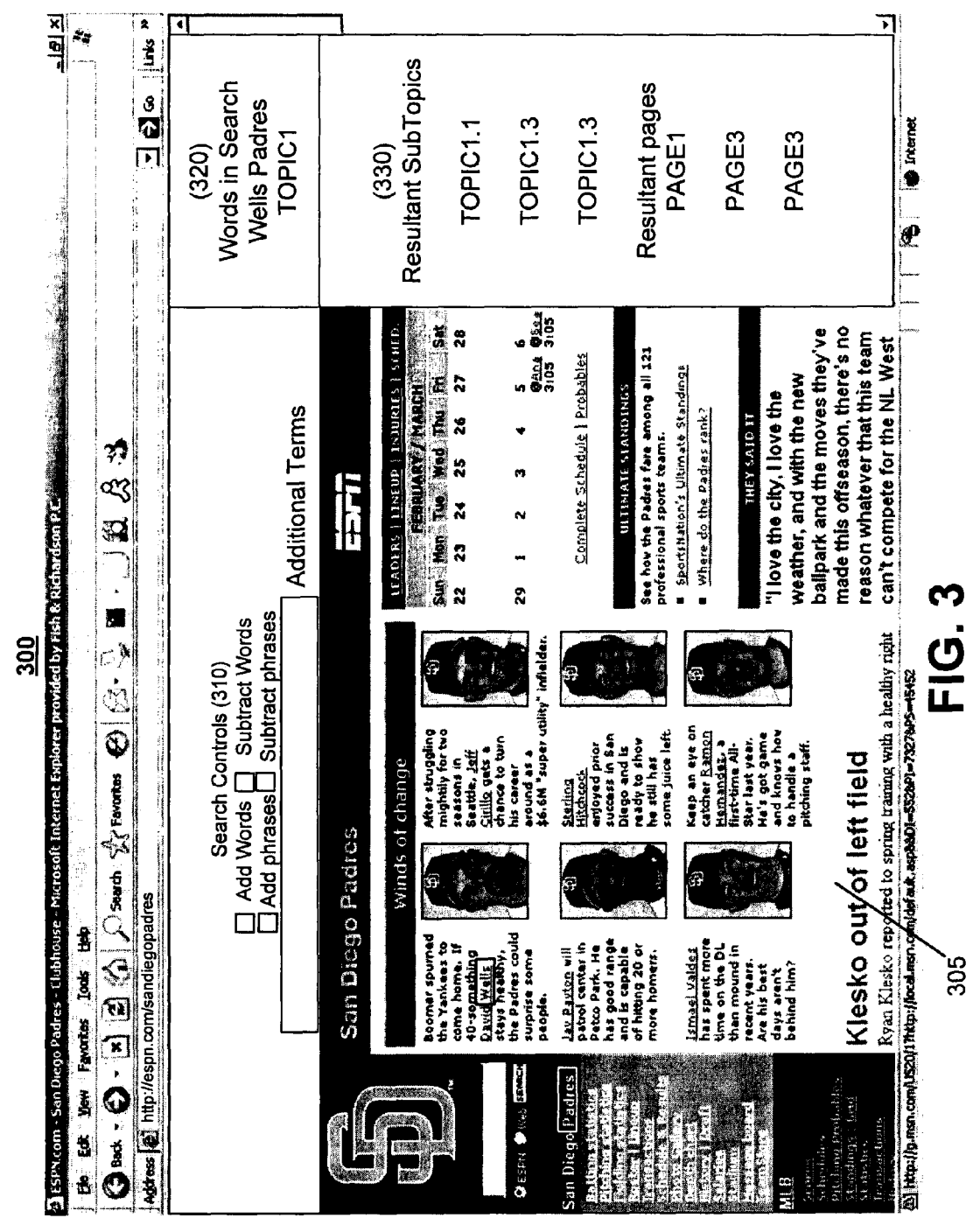

FIG. 3 illustrates an exemplary GUI 300 enabling a user to select terms and resultant topics from a document 305 in order to generate results responsive to a user's predicted interest. In particular, GUI 300 illustrates how a search configuration and search results may include a representation both topics and the actual results themselves. For example, search configuration 320 includes both terms ("Wells" and "Padres") and a topic (TOPIC1). Similarly, the results section 330 includes three subtopics (TOPICS 1.1, 1.2, and 1.3) and three results (PAGES1-3). A user may interact with the topics and results to retrieve more responsive results.

In one implementation, manipulation of the search configuration and user interaction with the results is monitored so as to determine results and areas of subject matter that are not responsive to a user's interest. For example, if a user navigates a portion of topic taxonomy (e.g., TOPIC1.1 and TOPIC1.1's children) without accessing results related to the navigated portion, user disinterest in the navigated portion may be inferred. As a result, the search configuration may be monitored to reflect the user disinterest. In one implementation, the user disinterest is expressly confirmed and/or rendered. Thus, a user may be asked to confirm their disinterest in the navigated TOPIC (or metadata for the TOPIC) before adding the user disinterest in the navigated TOPIC. Alternatively, the user disinterest may be automatically added to the search configuration. The user disinterest may be expressly rendered in that the search configuration 320 would include terms and/or topics representative of the user disinterest. Alternatively, the user disinterest may be transparent so that the user need not manage a more complex search configuration. A transparent use of user disinterest may modify a user search profile to reflect the terms, topics, or metadata descriptive of the user disinterest. The user search profile then may be used by a search engine manipulating the data to return results responsive to the user search profile in addition to a particular search configuration.

FIG. 4 illustrates an exemplary GUI 400 enabling a user to select an adjacent sequence of terms (e.g., a phrase) from a document 405 in order to generate results responsive to a user's predicted interest. Generally, GUI 400 is similar to GUIs shown in FIGS. 1-3. However, GUI 400 illustrates that the search application may be configured to enable user input of a phrase. As shown, a user begins selecting at a first word (e.g., "San") and continues selecting through a second word ("Diego") onto a final word ("Padres"). For example, the user select a phrase by using a button on a mouse to select a first word, continue holding down the mouse as an icon is moved through additional words, and release the button after the mouse has been selected. Thus, as shown, "San Diego Padres" has been selected and is highlighted in the source document. Selecting "San Diego Padres" added the phrase "San Diego Padres" to the search configuration 420.

Although GUI 400 illustrates how phrases expressly selected may be used in a search configuration 420, other phrases or terms not expressly selected in the source document also may be used in a search configuration. For example, a particular word standing alone may have a diverse and inconsistent number of meanings. However, the word may be analyzed using context information for the selected word. In one example, the context includes neighboring words, that is, words adjacent to the selected word or term as it is used. In another example, the context includes prominent words appearing elsewhere in the source document, in varying degrees or even independent of the proximity of the prominent word to the selected words. For example, as shown in GUI 400, the term "MLB" appearing in the left column may be used as contextual information to distinguish baseball results from non-baseball results.

In one implementation, the contextual information is passively entered from the source document. For example, passively entering the contextual information may include using an application to automatically identify prominent words appearing in the source document. In contrast, the contextual information may be actively entered where a user is notified or prompted as to the inclusion or availability of contextual information. For example, the user may be notified that adding the terms "MLB" and "NL West" would lead or likely lead to more meaningful results. The user then may be prompted to use "MLB" and "NL West" to the search configuration.

Figure 5:
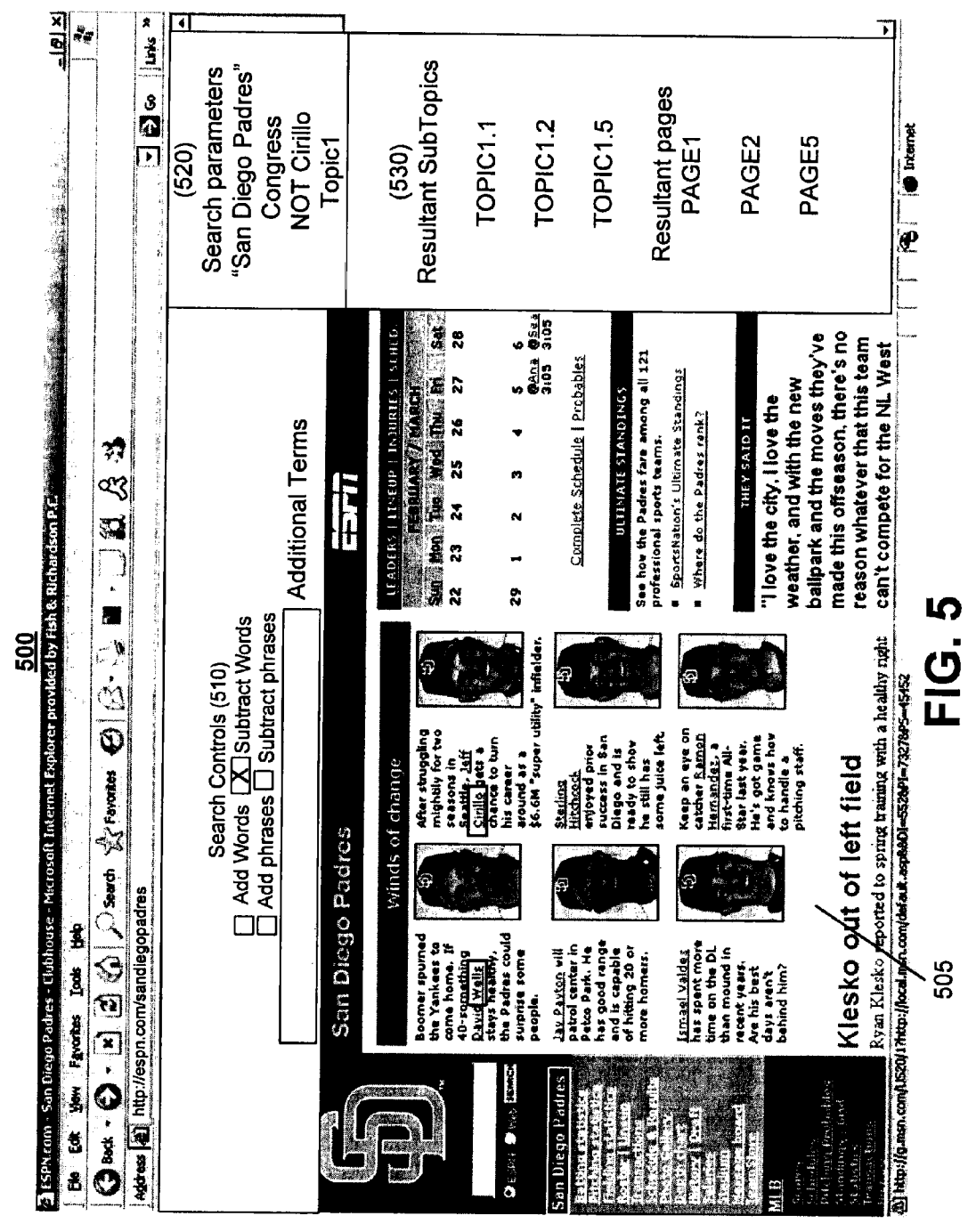

FIG. 5 illustrates an exemplary GUI 500 enabling a user to select words from a document 505 that should not appear or be related to the search results. Generally, GUI 500 is similar to GUIs shown in FIGS. 1-4. However, GUI 500 illustrates that the search application may be configured to enable user input of terms that should not appear. As shown, a user has selected "San Diego Padres" for inclusion from the source document, and also selected that results related to "Cirillo" should not be included in the search results.

In one implementation, the negative limitations such as "Cirillo" are after the "Subtract Words" or "Subtract Phrases" is selected in Search Controls 510. In another limitation, the user may select a sequence of terms or phrases for negative limitations. In yet another implementation, a first control (e.g., a left mouse button) is used to add "positive" limitations to the search configuration while a second control (e.g., a right mouse button) is used add negative limitations to the search configuration. As the positive or negative limitations are added to the search configuration, the results may be automatically or periodically updated to reflect a particular search configuration.

Figure 6:
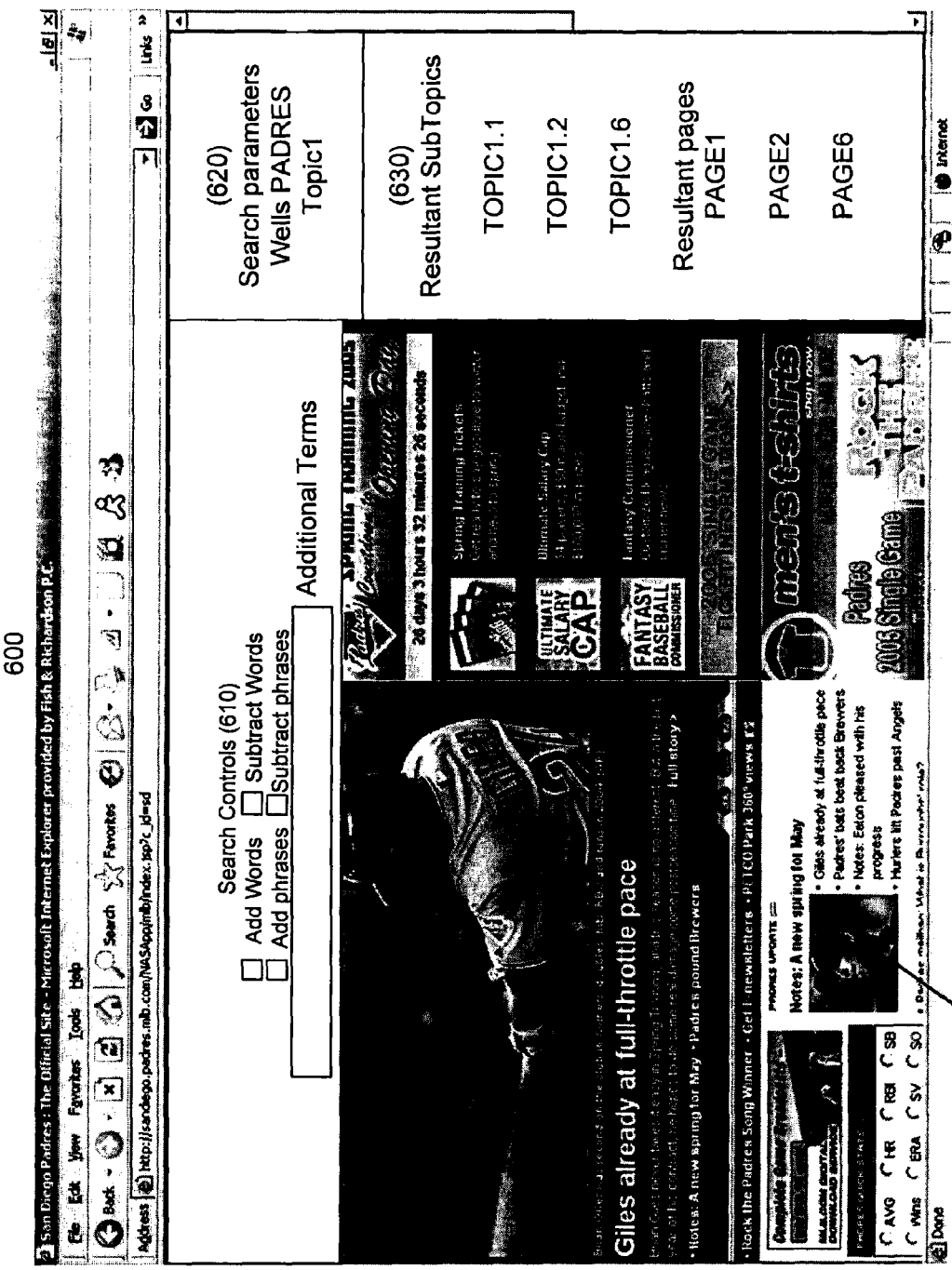

FIG. 6 illustrates an exemplary GUI 600 enabling a user to preserve a search configuration generated from prior document as a subsequent document 605 is being presented. Generally, GUI 600 is similar to GUIs shown in FIGS. 1-5. However, GUI 600 illustrates that a search configuration generated on a previous source document, such as the source documents shown in FIGS. 1-4, may be preserved and used as a basis for searches with additional terms appearing in other source documents. As shown, terms from a prior configuration "Wells" and PADRES and TOPIC1 have been preserved while the web page acting as the source document has changed. Thus, by preserving all or part of a search configuration, a user may explore modifications to the search configuration based on terms appearing in other source documents that may be investigated.

FIG. 7 illustrates an exemplary GUI 700 enabling a user to specify a relative preference for terms that may be used to adjust the abrupt discontinuity resulting from use of Boolean searching. Generally, GUI 700 is similar to GUIs shown in FIGS. 1-6. However, GUI 600 illustrates that a search configuration may include buttons enabling a user to specify favoritism or "disfavoritism" for selected terms from a document 705. Generally, favoritism relates to a user designation that elevated or reduces the prominence of the favor/disfavored terms. As a result, results relating to favored terms may appear with a more relevant designation (e.g., by score) and/ or are rendered before less relevant results while results relating to disfavored terms would be designated as being less relevant and/or less likely to be rendered compared to terms having more relevant results. Additionally, the favored/disfavored designation may be used so that results otherwise relevant would be returned when results do not relate to the favored/disfavored term. For example, a user may selectively invoke a favored/disfavored designation to observe the effect on results. Adding a term as a favored may increase the likelihood of less trafficked web site relating to an obscured favored term being identified while also identifying web sites otherwise deemed relevant. In contrast, using Boolean constraints (e.g., AND, OR, NOT) to require an obscure term may only identify those obscure web sites and not identify the web sites otherwise deemed relevant.

In one configuration, a favoring/disfavoring control adjusts a weighting factor for a search results. Favoring a term may add or positively adjust a score for a potential result. As a result, if query results are ranked by relevance, i.e., according to a score, potential results that reflect a favored term would appear earlier or more prominently as the query results are rendered, while a disfavored term would appear later or less prominently as the query results are being rendered.

In another configuration, a favoring/disfavoring control is used as limited filter such that potential results that include the favored term are automatically presented earlier or more prominently than potential results that do not include the favored term.

Figure 8:
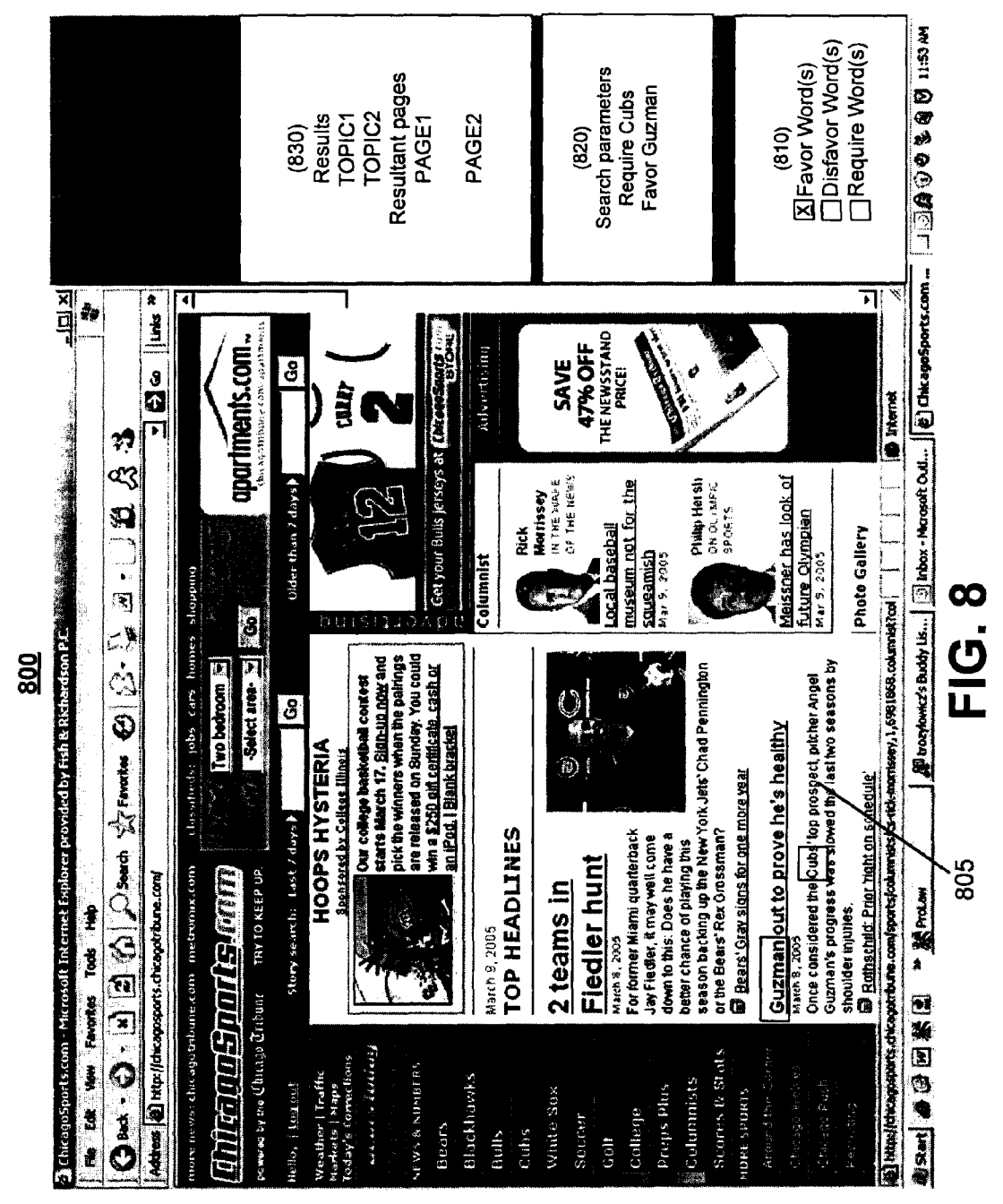

FIG. 8 illustrates an exemplary GUI 800 enabling a user to access a search configuration 820 and search results 830 in a display separate and distinct from the source document 805. In this manner, multiple source documents may be simultaneously accessed to modify the search configuration 820. Note that in GUI 800, a web page relating to Chicago sports is used as the source document. The search controls 810 enable a user to favor, disfavor, or require words appearing in the source document. As shown, the source document illustrates that "Guzman", and "Cubs" have been selected. The search configuration 820 indicates that "Cubs" is required and "Guzman" is favored. Finally, the results portion 830 includes TOPIC1, TOPIC2, PAGE1, and PAGE2.

Figure 9:
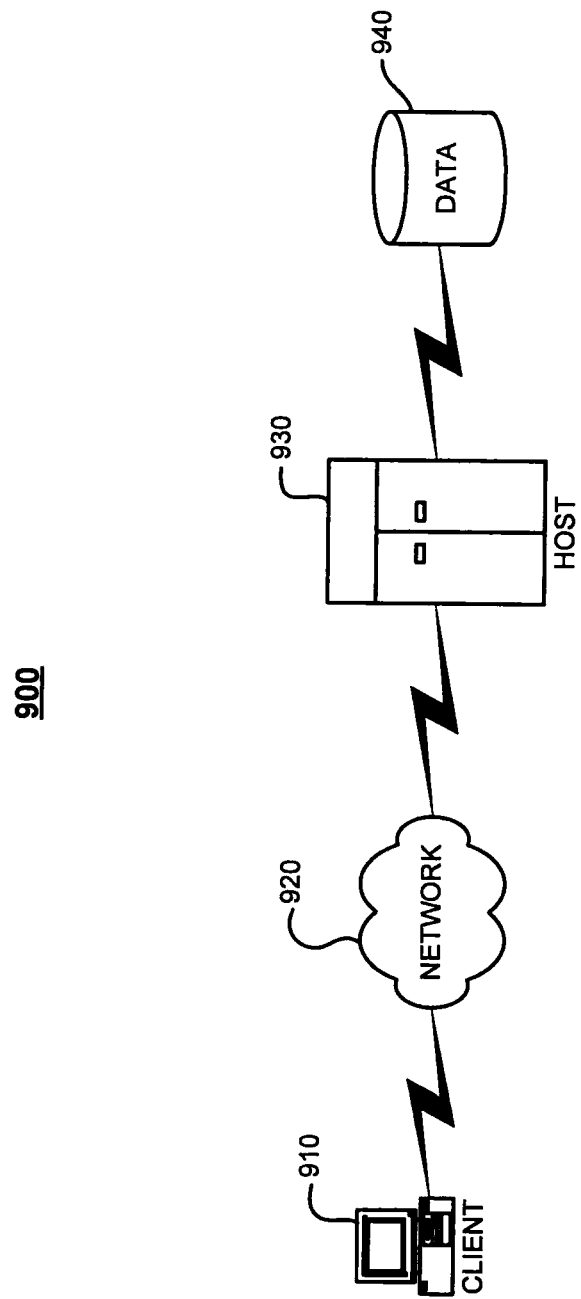
FIG. 9 illustrates a communications system that may be used to intelligently present results related to a term stream analyzed by a host.

FIG. 9 shows a communications system 900 that enables intelligent presentation of results related to a term stream. Generally, a client 910 exchanges communications relating to a term stream with a host 930 using network 920. The host 930 analyzes the term stream to generate results related to the term stream using, for example, a database 940 (e.g., a yellow pages directory or a mapping system). The host 930 provides one or more results to the client 910, which in turn displays the results.

Generally, the client 910 includes a computing device that enables a user to exchange information over a communications network. The client 910 may include one or more devices capable of accessing content on the host 930. The client 910 also may include a controller (not shown) that processes instructions received from or generated by a software application, a program, a piece of code, a device, a computer, a computer system, or a combination thereof, which independently or collectively direct operations of the client 910. The instructions may be embodied permanently or temporarily in any type of machine, component, equipment, storage medium, or propagated signal that is capable of being delivered to the client 910 or that may reside with the controller at client 910. Client 910 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 910 includes one or more information retrieval software applications (e.g., a browser, a mail application, an instant messaging client, an Internet service provider client, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, client 910 may include a wireless telephone running a micro-browser application on a reduced operating system with general purpose and specialized hardware capable of operating in mobile environments.

The client 910 includes one or more term stream code segments that analyze a term stream input to an information retrieval application. The term stream code segment receives the term stream and structures the exchange of the term stream with other software applications on the client 910 and/or host 930. For example, the term stream code segment may wait initially wait until X initial terms are received before sending a transmission to the host 930. The term stream code segment then may send updates to the host every Y subsequent terms. Alternatively, the term stream code segment may include a delay feature set that transmits an update to the term stream if there are Z seconds of user inactivity. Thus, when X is 3 ("three") terms, Y is 2("two") terms, and Z is 1 ("one") second, the term stream code segment for a user who selects in "Prior Cubs Wood Wrigley Dusty" would request results 1) after "Prior Cubs Wood" 2) after "Prior Cubs Wood Wrigley", and "Prior Cubs Wood Wrigley Dusty". In the same example, if the user selected "Prior" and paused for more than a second (when Z=1 second and the delay feature set is being used), the term stream code segment would send the "Prior" term to the host for analysis.

The client 910 may include a preliminary analysis code segment to analyze the term stream and send periodic updates. The preliminary analysis code segment screens the term stream to enhance the efficacy of the results generated for the term stream. In one example, the preliminary analysis code segment identifies one or more databases or segments likely to be associated with the predicted interest of a consumer. Thus, when "20005" is entered, the preliminary analysis code segment may instruct an instruction in the transmission to the host 930 to poll geographic information related to zip code 20005. Other examples may include the preliminary analysis code segment identifying a service industry (e.g., plumbers), a segment (e.g., online music), or a combination of factors (e.g., plumbers in zip code 20005) as relevant to the results that are sought by the user. With the preliminary factors identified, the transmission may be sent to an appropriate database, or a query may be modified as a result of performing the preliminary analysis.

In another example, the preliminary analysis code segment also may correlate information that has been learned about a user with the term stream. If the client is believed to be operating in a particular area (e.g., based on billing information for the user), the term stream can be modified to instruct the host 930 that results should be responsive to the user's address of record. Similarly, the preliminary analysis code segment may interface with a cache or user history to better identify results for the user. Thus, if a history of user activity indicates that the user is interested in National Football League sporting events, the preliminary analysis code segment may tailor results based on the relationship of the results to American Football rather than International Football (soccer). The preliminary analysis code segment also may retrieve and display locally stored results before the host 930 is accessed.

The client 910 may include a communications code segment that interfaces with the information retrieval code segment (e.g., browser or key word tool) to modify the term stream results to reflect the network environment of the client. For example, when the client 910 includes a wireless phone with limited bandwidth, the communications code segment may structure the communications exchange to limit the amount of data in results that are returned so as not to overwhelm the network 920. This may include filtering the results so that no more than a specified number of results are returned. Similarly, the format of the results may be modified to reduce the bandwidth of results. For example, results transmitted to the client 910 may have the graphics or images removed from the application.

The client may include a display code segment that tailors the results to a display device (e.g., a monitor or a LCD ("Liquid Crystal Display")). The display code segment may manage the presentation of results so that only the most likely results are presented. The display code segment may interface with the host 930 so that the number of results does not overwhelm the memory or display capabilities of the client. In one example, the display code segment may instruct the host 930 to transmit no more than a specified number of results. In another example, the display code segment may instruct the host 930 to not return any result items larger than a specified size.

The client 910 may include one or more media applications. For example, the client 910 may include a software application that enables the client 910 to receive and display an audio or video data stream. The media applications may include controls that enable a user to configure the user's media environment. For example, if the media application is receiving an Internet radio station, the media application may include controls that enable the user to select an Internet radio station, for example, through the use of "preset" icons indicating the station genre (e.g., country) or a favorite.

The network 920 may include hardware and/or software capable of enabling direct or indirect communications between the client 910 and the host 930. As such, the network 920 may include a direct link between the client 910 and the host 930, or it may include one or more networks or subnetworks between them (not shown). Each network or subnetwork may include, for example, a wired or wireless data pathway capable of carrying and receiving data. Examples of networks include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The host 930 is generally capable of executing instructions under the command of a host controller (not shown). The host 930 may include one or more hardware components and/or software components. An example of a host 930 is a general-purpose computer (e.g., a server or a mainframe computer) capable of responding to and executing instructions in a defined manner. Other examples include a special-purpose computer, a workstation, a PC, a device, a component, other physical or virtual equipment, or some combination thereof capable of responding to and executing instructions.

The controller is a software application loaded on the host 930 for commanding and directing communications exchanged with the client 910. Other examples include a program, a piece of code, an instruction, a device, a computer, a computer system, or a combination thereof, for independently or collectively instructing the client 910 or the host 930 to interact and operate as described. The host 930 may be embodied permanently or temporarily in any type of machine, component, physical or virtual equipment, storage medium, or propagated signal capable of providing instructions to the client 910 or the host 930.

The controller may include one or more information providing applications to support information retrieval requests sent from the client 910. The information providing applications may include a results code segment that receives a term stream from the client 910 and generates results responsive to a predicted interest by an individual user. Thus, the results code segment may generate one or more results based on the exchange of a term stream received from a client 910.

The results code segment also may receive term stream modifiers received from the preliminary analysis code segment, the communications code segment, the display code segment, and/or other code segments that modify a term stream transmission from the client. The results code segment may process the term stream in accordance with these modifiers. The host 930 also may operate code segments that perform operations similar to the feature sets in the preliminary analysis code segment, the communications code segment, and the display code segment. These host-oriented versions of these code segments may interface with the results code segment to modify the analysis performed and/or the results that are returned. For example, the host 930 may initially access a cache of content previously requested by the user. The previously-returned results may be analyzed for relevancy before additional analysis is performed or additional systems are polled.

The host 930 may interface with a database 940 to analyze the term stream. Generally, the database 940 includes storage for a volume of data and a processing engine that enables the data to be sorted, searched, and analyzed. The database may be organized along functional criteria. For example, a mapping database may be organized by geographical region, while a yellow pages database may be organized by business as well as geographic criteria. In one example, the database may be structured to perform a more detailed analysis on a term stream provided by a host 930. For example, a host 930 may receive a term stream from a client and redirect queries to one or more databases 940. Each of the redirected queries may be modified to further refine the redirected query. For example, a query redirected to a yellow pages directory may have the zip code added as a selection term. Similarly, a query directed to a database that provides stock quotes may include a reference describing which stocks are of interest to the user (e.g., stocks owned by the user).

Figure 10:
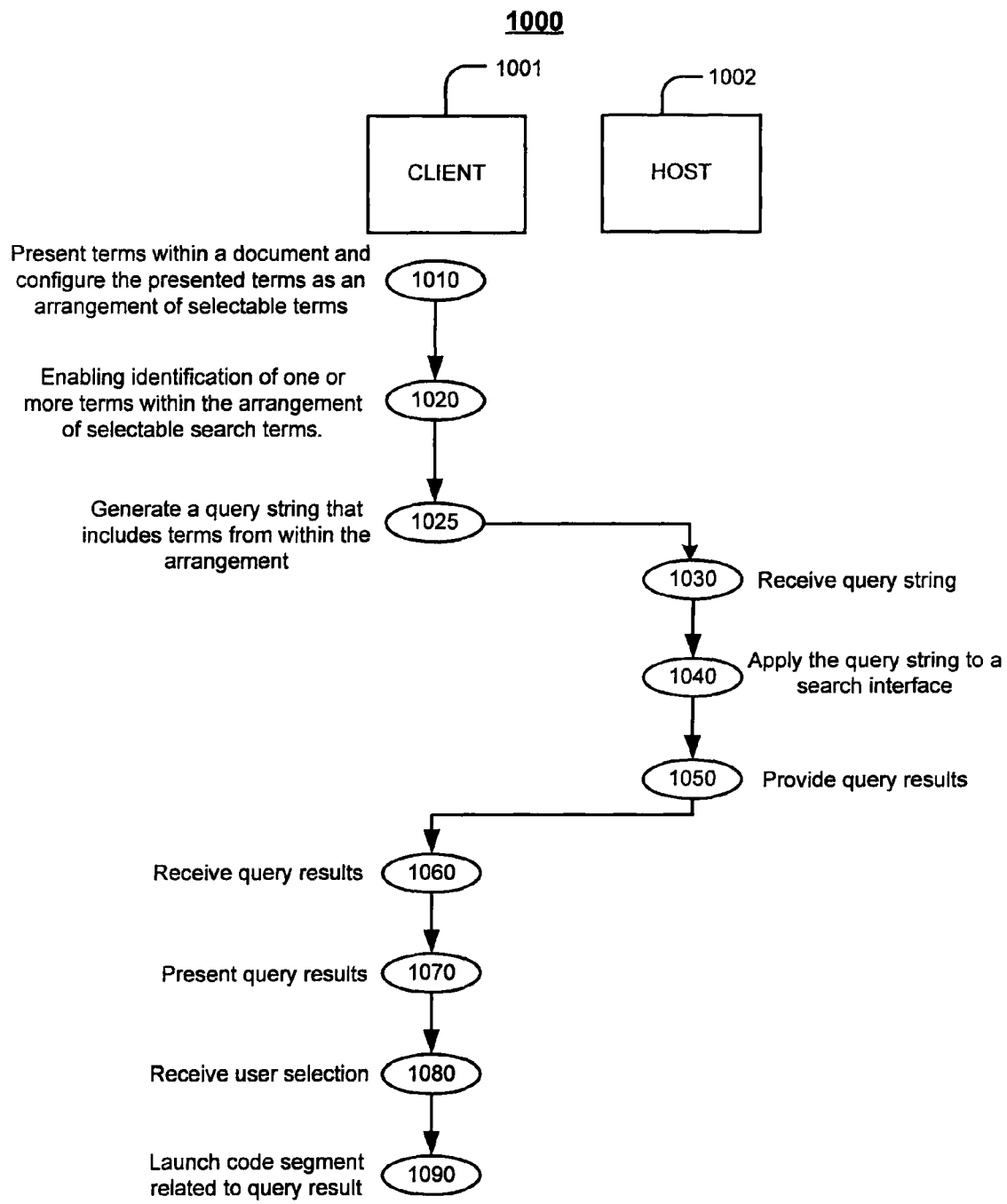
FIG. 10 is a flow chart of an exemplary process by which a client may use a host to intelligently present results related to a term stream.

Referring to FIG. 10, a flow chart 1000 illustrates how a client 1001 may use a host to intelligently present results related to a term stream. Generally, the systems in flow chart 1000 relate to the systems described in FIG. 9.

Initially, the client 1001 presents terms within a document and configures the presented terms as an arrangement of selectable terms (1010). For example, a client may load a web page. Identification of one or more terms within the arrangement of selectable search terms is enabled (1020). For example, a user may load a web page toolbar assistant that enables a user to select terms within the web page. The user may identify terms using a mouse or touch screen. For example, a user may select one or more terms appearing in a web page to add the terms to a search configuration.

The client 1001 generates a query string that includes terms from within the arrangement (1030). Although generating a query string (e.g., a search configuration) is shown as being performed on the client 1001, the search configuration also may be generated on the host 1002 and/or on a combination of the client 1001 and the host 1002. In one implementation, selecting a term automatically sends the selected term to a host 1002 for inclusion in a search configuration. In another example, the client 1001 generates a search configuration on the client 1001 and sends the search configuration and updated search configurations to the host 1002 as a result. In yet another example, an initial search configuration may be locally generated on the client 1001. The initial search configuration then may be transmitted to the host 1002 for analysis. The client 1001 then may receive results from the host 1002, and enable the user to interact with the results to modify the search configuration. In response to user modification, the client 1001 may analyze and display updated results responsive to the modification while the host 1002 in parallel receives an updated search configuration for additional processing and retrieval.

In any event, the host 1002 receives the query string (1030) and applies the query string to a search interface (1040). Typically, applying the query string includes the host 1002 analyzing the term stream. Analyzing the term stream may include relating the received term stream to one or more results that are responsive to a predicted interest by the user. In one example, the term stream may be compared with metadata labels used to describe content accessible to the host 1002. For example, when the term stream includes "Prior", the host 1002 may anticipate that "Cubs" will eventually be entered and identify web pages that feature the Chicago Cubs in the web page and/or are summarized by metadata labels (e.g., "Chicago Cubs"). However, the host 1002 need not find identical term matches. For example, the host 1002 may predict that a user entering "Mark Prior" is predictive of an interest in baseball. Accordingly, when the host 1002 analyzes the results, the host 1002 may also identify results related to baseball, even if the results are not related to Mark Prior.

Analyzing the term stream may include ranking the relative relevancy of results. For example, widely visited baseball web sites (e.g., Major League Baseball's web site) may be scored as more relevant to a baseball fan than a web site that includes a Chicago resident's personal baseball web log ("blog"). The results may be generated in such a manner that the more relevant results are returned before the less relevant results.

With the term stream analyzed and the results identified, the host 1002 exchanges results with the client 1001. The results may be controlled so as to comply with the network or display constraints of the client. For example, if the network has limited bandwidth or the client has limited display capabilities, the host 1002 may structure the transmission to avoid network congestion or may modify the results so as provide more suitable results (e.g., by removing images from the results that are returned). As a result, the host 1002 provides the query results (1050) to the client 1001, which receives the query results (1060).

The client 1001 may perform additional processing to review the results to increase the efficacy of the display. For example, the client 1001 may relate the returned results to a user profile and tailor the results to be displayed accordingly. In another example, the client may analyze the results to better develop the user profile and interests to increase the efficacy of subsequent term stream operations. Regardless of whether the results undergo intermediary processing, the client 1001 presents the query results (1070). The query results are presented in a manner that enables the user to select one of the results to invoke an application or present a more complete form of the result. For example, as a user selects a term stream in a key word retrieval application, a dynamically updated window of results may appear in the key word retrieval application with one or more likely results. As the user continues to select terms to modify the search configuration, the results appearing in the search results window (or a pane in a window) may be tailored to reflect the latest analysis of the term stream. The client 1001 receives the user selection from the results (1080). Selection of a result causes the application to launch a code segment related to the selected result (1090). For example, when the user selects a result describing a map of an area, a web browser accessing a mapping web site may be launched to display a map related to the inputted term stream.

Figure 11:
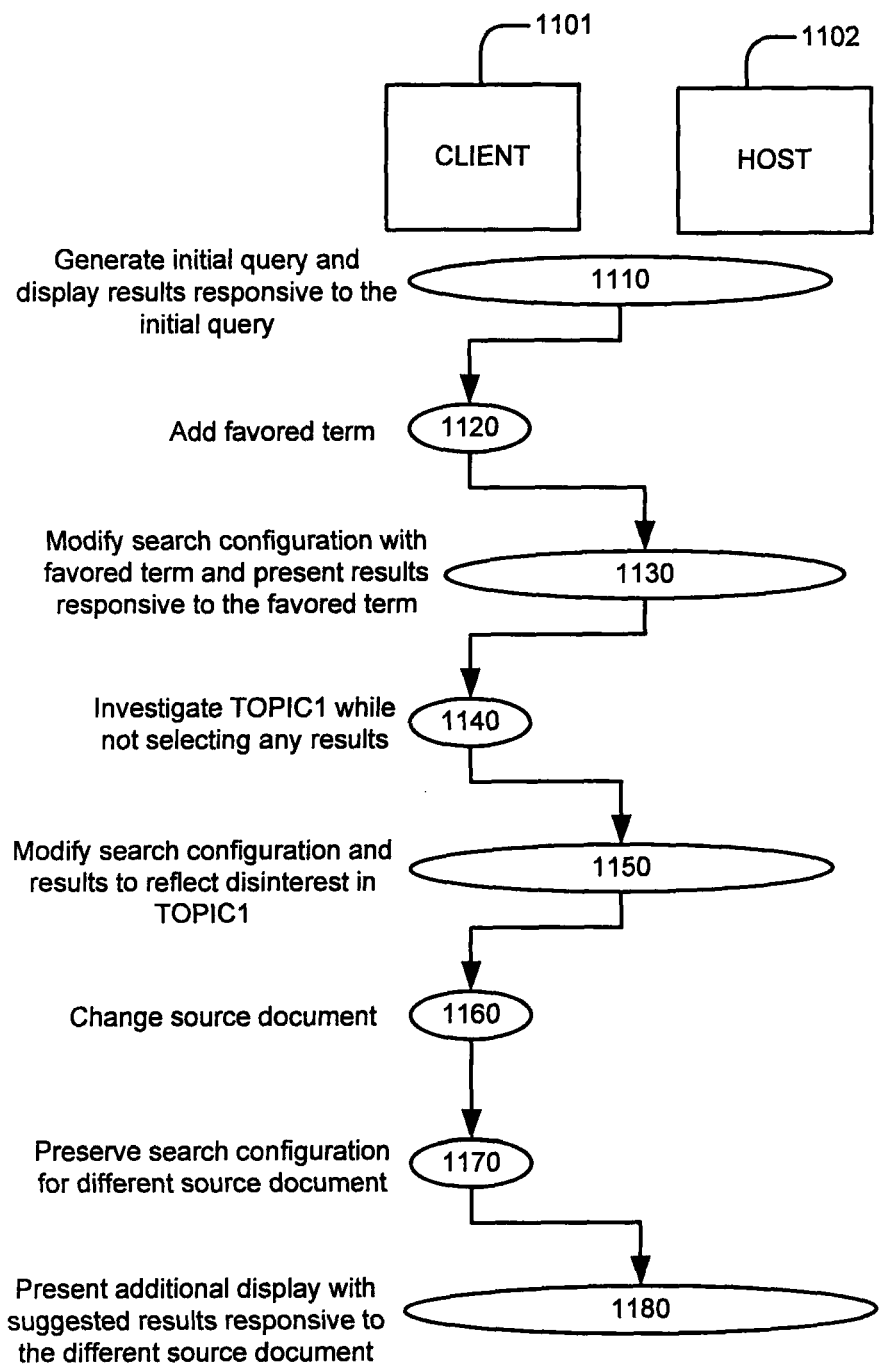
FIG. 11 is a flow chart of an exemplary process by which a client may modify a search configuration through explicit and implicit instructions from the user.

FIG. 11 shows a flow chart 1100 illustrating how a client 1101 may modify a search configuration through explicit and implicit instructions from the user. Generally, the operations shown in flow chart 1100 relate to update operations that are performed after an initial query has been performed and results responsive to the initial query have been generated (e.g., operation 1110). When perceiving the display, the client 1101 adds a favored term (1120). For example, the client 1101 may select an additional term and designate that results related to the additional term should be favored, that is, results related to the favored term should be rendered before results that do not relate to the favored term. The search configuration is modified to included the favored term and results responsive to the favored term are presented (1130). For example, the client 1101 may transmit an update to the host 1102 indicating that results from the previous search configuration should be analyzed for a relation to the favored term. Results relating to the favored term should thus appear as more relevant when an updated display is rendered.

The client 1101 then elects to investigate TOPIC1 but not select any results related to TOPIC 1 (1140). For example, the client 110 may select a topic that appears in a search results window (e.g., a user selects TOPIC1 in the resultant topics 130 shown in FIG. 1). Selecting the topic may render results related to the topic so that the user may better understand which content is related TOPIC1. After perceiving the results, the user may select a "Go Back" button or control that enables the user to return to a prior search configuration/results display, that is, a results display used before TOPIC1 was investigated. However, as a result of determining that user was able to perceive results related to TOPIC1 without selecting any of the results related to TOPIC1, user disinterest in TOPIC1 may be inferred. Thus, the search configuration and the results reflect a disinterest in TOPIC1 (1150).

The user then changes to a different source document (1160). For example, the user may select a hyperlink appearing in a web page. Even though the source document has changed, the search configuration has been preserved (1170). For example, the search configuration that appears in the right column of a web browser may continue to appear even though the user has selected a different web page.

Perceiving that the different source document may include information of use in retrieving results responsive to a user's predicted interest, an additional display is presented with suggested results responsive to the different source document (1180). In one implementation, a search tool in a web browser may prompt a user with a statement that "the present document includes information that may be used in generating more precise search results. Would you like to modify your search configuration using the present source document?" In response to user agreement, the search configuration may be modified to include metadata derived from the source document. In another implementation, the search configuration may be automatically updated after a first period of time (e.g., 30 seconds) to add metadata from the source document to the search configuration. In yet another implementation, a different search pane may be added in addition to an existing pane that uses a search configuration based on information from the different source document. The different search pane may be generated automatically or may be added in response to a user agreement to add a different search pane. The search configuration for the different pane may explicitly show metadata or terms from the different source document, or the metadata/terms may be transparent to the user.

Other implementations are in the scope of the following claims. For example, although the operations described examples of retrieving results that relate to terms or phrases appearing in one or more source documents, the results need not include the information that will ultimately be displayed upon launching a code segment. Rather, the results may include a label that describes the results that may be subsequently retrieved if accepted.

Similarly, the client and host applications may include assistants and spelling correction agents configured to work in conjunction with the underlying document and/or information separate from the source document that was inputted by the user (e.g., the user types in TERM in the ADDITIONAL TERMS field of search controls 110 in FIG. 1) in order to increase the efficacy of retrieved results. Assistants also may help the user by retrieving similar results related to the predicted character stream's meaning. For example, if the character stream includes "German automobiles," results that include prominent manufacturers of German automobiles, including Mercedes, BMW, and Audi, may be retrieved. Spelling correction agents may recognize that the user has likely entered a typographical mistake. In response, the spelling correction agents may correct the term stream by altering the entered term stream on the desktop and/or by retrieving results related to the predicted entry.

Similar to the spelling correction agent, the system may include a validation agent that may be used to validate a URL ("Uniform Resource Locator") entered in the term stream. For example, when the user enters the address for a web site, the web site address may be analyzed to determine if the device and file information actually exists and/or is correct. When the URL information is incorrect, the system may resolve the term stream to identify the correct or related URL address.

The client may be used to intelligently present results related to media communications such as streaming audio and video communications. For example, a content provider or a service provider may be distributing a large number of "channels" or bands of discrete presentations. A user may wish to survey the channels to find channels presenting information most relevant to the user's interests. Accordingly, the user may access a source document with one or more terms that the user selects to find content the user finds of interest. For audio content, the term stream may relate to an artist, album, or selection (e.g., song) name. For video content, the term stream may relate to a particular news affiliation (e.g., TIME or CNN), show, episode, or subject mater. In any event, regardless of the underlying content, the sequence of terms may be used to retrieve results related to the user's interests as expressed in the term stream. This may be performed by comparing the entered term stream with metadata or subtitles associated with a particular media selection. In one instance, the term stream may be compared with the subtitles for available programming to identify results for the user. Thus, when the user enters the name in a term stream of a newsmaker, the subtitles of all available programming (including on-demand and broadcast streams) may be searched to identify media streams featuring the newsmaker.

The systems and operations may be modified to operate in an Intranet or trusted environment. For example, rather than searching public databases, the system may be configured to incorporate security procedures and practices associated with a trusted environment. Thus, a sales employee may be allowed to access customer and marketing databases in analyzing the term stream. Engineering personnel may be allowed to review technical and operational support databases to support their mission, but may be precluded from analyzing the term stream using a sales database. Management and/or investigatory personnel may be allowed to access most or all databases in analyzing a term stream.

The results may be stored on the client and/or the host. For example, the host may cache previously returned results that may be used when analyzing subsequent term streams. In another example, previously selected results may be stored on the client and subsequent term streams may initially be accessed using the previously-stored results.

The client may enable the user application to launch a messaging code segment. Alternatively, the user may use a messaging application as a source document from which a term stream is generated. For example, the user may use an instant messaging application as a source document. User controls may enable user manipulation of the instant messaging application to transmit the term stream to a host for analysis. The client may receive the results and enable the client to access relevant results.

The search application may include an update code segment configured to provide additional search results based on newly entered terms and/or as results perceived to be more relevant become available. For example, a searching code segment may begin querying a host when a threshold of terms is entered and then query the host upon receiving updates with additional terms. Exchanging the updates may include exchanging only the portion of the term stream that has changed since the term stream was last exchanged. For example, as a user selects terms appearing in a first application, the first application may send a message to the host with the initially entered term stream (e.g., "Chicago"). As the user enters updates to the term stream (e.g., by selecting "Cubs"), the client may send the new information without sending the old information (e.g., the client subsequently sends "Cubs" instead of "Chicago"). Alternatively, the client may send the current term stream (e.g., sending "Chicago" and "Cubs").

The client and/or host may determine that there are no relevant results and operate to preclude additional processing resources from being used. For example, the user may be entering term streams for which the host has no information and generates no results. When the host determines that there is no information, the host may interface with the client to prevent additional updates from being exchanged. Such a condition occurs when the user enters a term stream that does not relate to content accessible by the host. For example, the host may determine that TERMSTREAM1 will not yield any results, and no additional terms to the required terms in TERMSTREAM1 will yield any results. If the user enters additional terms, such as TERMSTREAM123, the first application may be configured to not send any updated information to the host. However, if the user removes terms from the term stream so that TERMSTREAM1 is changed to TERM-STREAM, the term stream may be exchanged.

The client may perform preliminary analysis to preclude common terms in the term stream from being analyzed where the common term stream generates results that are not responsive to the predicted interest of a user. For example, when "the" appears in a term stream, particularly in an initial portion of the term stream, generating results using the term stream "the" likely generates too many results, few, if any, of which are responsive to the predicted interest of the user. Accordingly, exchanging the term stream may be delayed until the term stream is meaningful. Thus, exchanging the term stream "the" may be delayed until term stream reads "the Greek islands" or another term stream likely to generate meaningful results. Similarly, the term stream may be restructured to remove strings in the term stream not likely to assist in the analysis (either on the client or the host). Thus, strings appearing in the term stream such as "the", "a", and "this" may be removed from the term stream prior to exchanging the term stream.

The results and additional information descriptive of results previously returned or selected may be stored on the client and/or the host. For example, the most recently accessed results may be cached on the client, while a more extensive history of results may be cached on the host. The stored results may be accessed and used to analyze and generate results responsive to a user's predictive interest.

To illustrate how stored results may be used to analyze a subsequent term stream, a previous search related to the National Football League (NFL) may generate a series of metadata tags. These metadata tags may be stored in a profile associated with the user. For example, the user searching for NFL-related information may have the metadata tags "NFL", and "Football" added to their user profile. The metadata tags may be used in performing subsequent analysis. Thus, when the user types in "Falcons", additional metadata tags related to the multiple meanings of "Falcons" may be generated and analyzed using the metadata tags previously generated. Examples of metadata tags related to Falcons may include terms such as "NFL", "Audubon Society", and "Sport of Kings". The metadata tags from the previous search on the NFL may be compared against metadata tags generated by entering "Falcons". By correlating the results from a previous search with known metadata tags for the term of interest, results that are likely to be more responsive to the predicted interest of a user are returned. In this case, correlating the results of the previous search with the present search generates results related to the NFL's Atlanta Falcons.

The results from multiple users may be used to determine results that are more responsive to a predictive interest of a different user. For example, if most of the users entering "Falcons" as a term stream are determined to be interested in the NFL, a default rule may be created and adopted that returns results related to the NFL sports team in response to "Falcons." A finer analysis may be performed by suspending the default rule when the user has a profile or has expressed an interest in other, non-sports aspects of "falcons" or used modifiers such as "birds", "Audubon Society", or "kestrels".

Other implementations are within the scope of the following claims.

What is claimed is:

1. A computer-implemented method comprising:
providing to a user a web page in conjunction with a first search result, the first search result being associated with a first search query comprising one or more terms;
identifying, using at least one processor, contextual information associated with the first search query based on content within the web page;
providing, to the user, a selectable option corresponding to a candidate search term associated with the contextual information, wherein the candidate search term is different than the one or more terms of the first search query;
detecting a user selection of the selectable option corresponding to the candidate search term;
generating a second search query, using the at least one processor, the second search query comprising the one or more terms of the first search query and the candidate search term;
identifying contextual information associated with a second search result associated with the second search query;
determining whether the second search result is contextually relevant to the first search query;
visually distinguishing the candidate search term from other content within an additional web page associated with the second search result when the second search result is contextually relevant to the first search query; and
providing the additional web page corresponding to the second search result.

2. The method of claim 1, wherein providing the selectable option corresponding to a candidate search term further comprises providing a plurality of selectable options corresponding to a plurality of candidate search terms.

3. The method of claim 2, further comprising:
detecting a user selection of multiple selectable options from among the plurality of selectable options corresponding to the plurality of candidate search terms; and
wherein the second search query comprises the one or more terms of the first search query and multiple candidate search terms.

4. The method of claim 3, further comprising:
upon obtaining the second search result, providing a another selectable option corresponding to a another candidate search term;
detecting a user selection of the another selectable option corresponding to the another candidate search term;
generating a third search query comprising the second search query and the another candidate search term; and
obtaining a third search result associated with the third search query.

5. The method of claim 4, further comprising:
determining whether the third search result is responsive to an interest of the user; and
modifying the third search query in accordance with the interest of the user, when the third search result fails to be responsive.

6. The method of claim 5, wherein the modifying comprises:
identifying a search term of the third search query that is associated with the third search result; and
deleting the identified search term from the third search query.

7. The method of claim 5, wherein determining whether the third search result is responsive to the interest of the user comprises: receiving, from the user, an indication that the third search result fails to be responsive.

8. The method of claim 5, wherein determining whether the third search result is responsive to the interest of the user comprises:
determining whether the user accesses the third search result; and
determining that the third search result fails to be responsive to an interest of the user, when the user fails to access the third search result.

9. The method of claim 4, further comprising:
providing a portion of an additional web page to the user in conjunction with the third search result; and enabling the user to specify a modification to the third search query, in response to the displayed portion of the additional web page.

10. The method of claim 1, wherein visually distinguishing the candidate search term comprises at least one of (i) highlighting the candidate search term within a displayed portion of the web page or (ii) underlining the candidate search term within the displayed portion of the web page.

11. A system comprising:
at least one processor; and
at least one non-transitory computer readable storage medium storing instructions thereon that, when executed by the at least one processor, cause the system to:
provide to a user a web page in conjunction with a first search result, the first search result being associated with a first search query comprising one or more terms;
identify contextual information associated with the first search query based on content within the web page;
provide, to the user, a selectable option corresponding to a candidate search term associated with the contextual information, wherein the candidate search term is different than the one or more terms of the first search query;
detect a user selection of the selectable option corresponding to the candidate search term;
generate a second search query, the second search query comprising the one or more terms of the first search query and the candidate search term;
identify contextual information associated with a second search result associated with the second search query;
determine whether the second search result is contextually relevant to the first search query;
visually distinguish the candidate search term from other content within an additional web page associated with the second search result when the second search result is contextually relevant to the first search query; and
provide the additional web page corresponding to the second search result.

12. The system of claim 11, further comprising instructions that, when executed by the at least one processor, cause the system to provide a plurality of selectable options corresponding to a plurality of candidate search terms.

13. The system of claim 12, further comprising instructions that, when executed by the at least one processor, cause the system to:
detect a user selection of multiple selectable options from among the plurality of selectable options corresponding to the plurality of candidate search terms; and
wherein the second search query comprises the one or more search terms of the first search query and multiple candidate search terms.

14. The system of claim 13, further comprising instructions that, when executed by the at least one processor, cause the system to:
upon providing the additional web page, provide another selectable option corresponding to another candidate search term;
detect a user selection of the another selectable option corresponding to the another candidate search term;
generate a third search query comprising the second search query and the another candidate search term; and
obtain a third search result associated with the third search query.

15. The system of claim 14, further comprising instructions that, when executed by the at least one processor, cause the system to:
determine whether the third search result is responsive to an interest of the user; and
modify the third search query in accordance with the interest of the user, when the third search result fails to be responsive.

16. The system of claim 15, further comprising instructions that, when executed by the at least one processor, cause the system to:
identify a search term of the third search query that is associated with the third search result; and
delete the identified search term from the third search query.

17. The system of claim 15, further comprising instructions that, when executed by the at least one processor, cause the system to:
receive, from the user, an indication that the third search result fails to be responsive.

18. The system of claim 15, further comprising instructions that, when executed by the at least one processor, cause the system to:
determine whether the user accesses the third search result; and
determine that the third search result fails to be responsive to an interest of the user, when the user fails to access the third search result.

19. The system of claim 14, further comprising instructions that, when executed by the at least one processor, cause the system to:
provide a portion of the additional web page to the user in conjunction with the third search result; and
enable the user to specify a modification to the third search query, in response to the displayed portion of the additional web page.

20. A non-transitory computer-readable storage medium storing instructions thereon that, when executed by a processor, cause a computer system to:
provide to a user a web page in conjunction with a first search result, the first search result being associated with a first search query comprising one or more terms;
identify contextual information associated with the first search query based on content within the web page;
providing, to the user, a selectable option corresponding to a candidate search term associated with the contextual information, wherein the candidate search term is different than the one or more terms of the first search query;
detect a user selection of the selectable option corresponding to the candidate search term;
generate a second search query, the second search query comprising the one or more terms of the first search query and the candidate search term;
identify contextual information associated with a second search result associated with the second search query;
determine whether the second search result is contextually relevant to the first search query;
visually distinguish the candidate search term from other content within an additional web page associated with the second search result when the second search result is contextually relevant to the first search query; and
provide the additional web page corresponding to the second search result.

* * * * *